United States Patent
Ding et al.

(10) Patent No.: US 8,798,127 B2
(45) Date of Patent: Aug. 5, 2014

(54) APPARATUS AND METHODS FOR ADAPTIVE RECEIVER DELAY EQUALIZATION

(71) Applicant: Altera Corporation, San Jose, CA (US)

(72) Inventors: Weiqi Ding, Fremont, CA (US); Wei Li, Fremont, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 98 days.

(21) Appl. No.: 13/678,163

(22) Filed: Nov. 15, 2012

(65) Prior Publication Data
US 2014/0133529 A1   May 15, 2014

(51) Int. Cl.
*H03H 7/40* (2006.01)
*H04L 27/01* (2006.01)
*H04L 25/03* (2006.01)

(52) U.S. Cl.
CPC .......... *H04L 27/01* (2013.01); *H04L 25/03885* (2013.01)
USPC ....................................................... 375/232

(58) Field of Classification Search
USPC .......................... 375/230, 232, 346, 350, 371
See application file for complete search history.

(56) References Cited

U.S. PATENT DOCUMENTS

| | | | |
|---|---|---|---|
| 8,446,186 B2 * | 5/2013 | Khoury et al. | 327/141 |
| 2002/0009169 A1 * | 1/2002 | Watanabe | 375/371 |
| 2006/0244505 A1 | 11/2006 | Fung et al. | |
| 2006/0256880 A1 * | 11/2006 | Frisch | 375/257 |
| 2009/0243682 A1 | 10/2009 | Huang | |
| 2009/0290671 A1 * | 11/2009 | Rea et al. | 375/371 |

OTHER PUBLICATIONS

Arnold Frisch "Handling differential skew in high-speed serial buses", Oct. 26, 2006, 4 sheets, WarpSpeed Chips LLC.
Michael J. Degerstrom, et al. "System Level Approach for Assessing and Mitigating Differential Skew for 10+ Gbps SerDes Appications", 2008 Electronic Components and Technology Conference, pp. 513-520, IEEE.
Yuxiang Zheng, et al. "A 5 Gb/s Automatic Within-Pair Skew Compensator for Differential Data in 0.13 um CMOS", Jun. 2011, pp. 1191-1202, IEEE Transactions on Circuits and Systems—1: Regular Papers. vol. 58, No. 6.

* cited by examiner

*Primary Examiner* — Khanh C Tran
(74) *Attorney, Agent, or Firm* — Okamoto & Benedicto LLP

(57) ABSTRACT

Disclosed are apparatus and methods for adaptive receiver delay equalization. One embodiment relates to a method for adaptive receiver delay equalization. Filtered positive and negative polarity signals are generated by a first variable-delay filter and a second variable-delay filter, respectively. A delay difference is determined between the filtered positive and negative polarity signals, and a skew-indication signal is generated based on the delay difference. A delay control signal is generated based on the skew-indication signal, and the delay control signal is sent to at least one of the first and second variable-delay filters. Other embodiments and features are also disclosed.

21 Claims, 11 Drawing Sheets

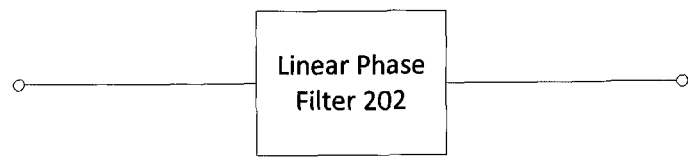
FIG. 2A   110P or 110N
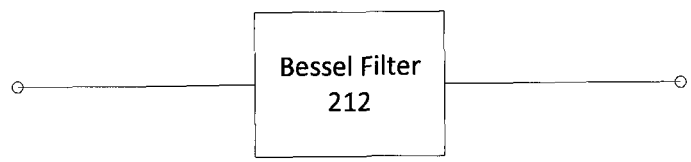
FIG. 2B   110P or 110N

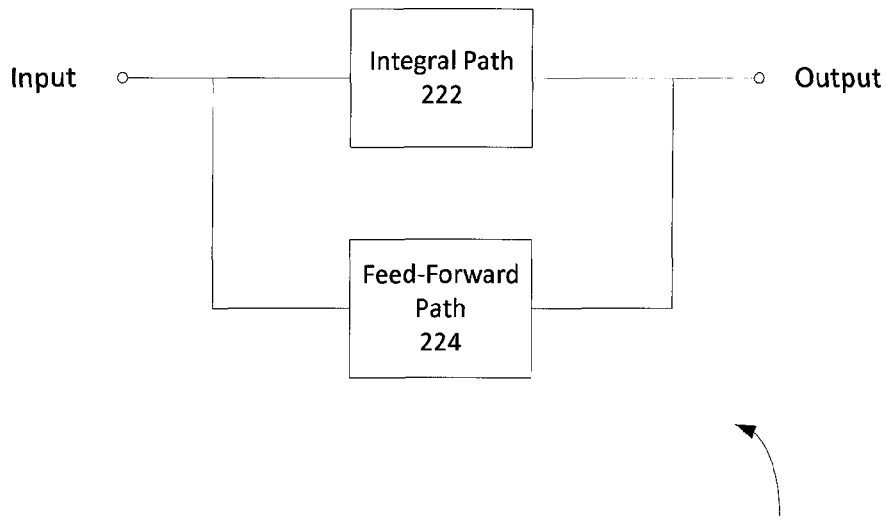
FIG. 2C   110P or 110N
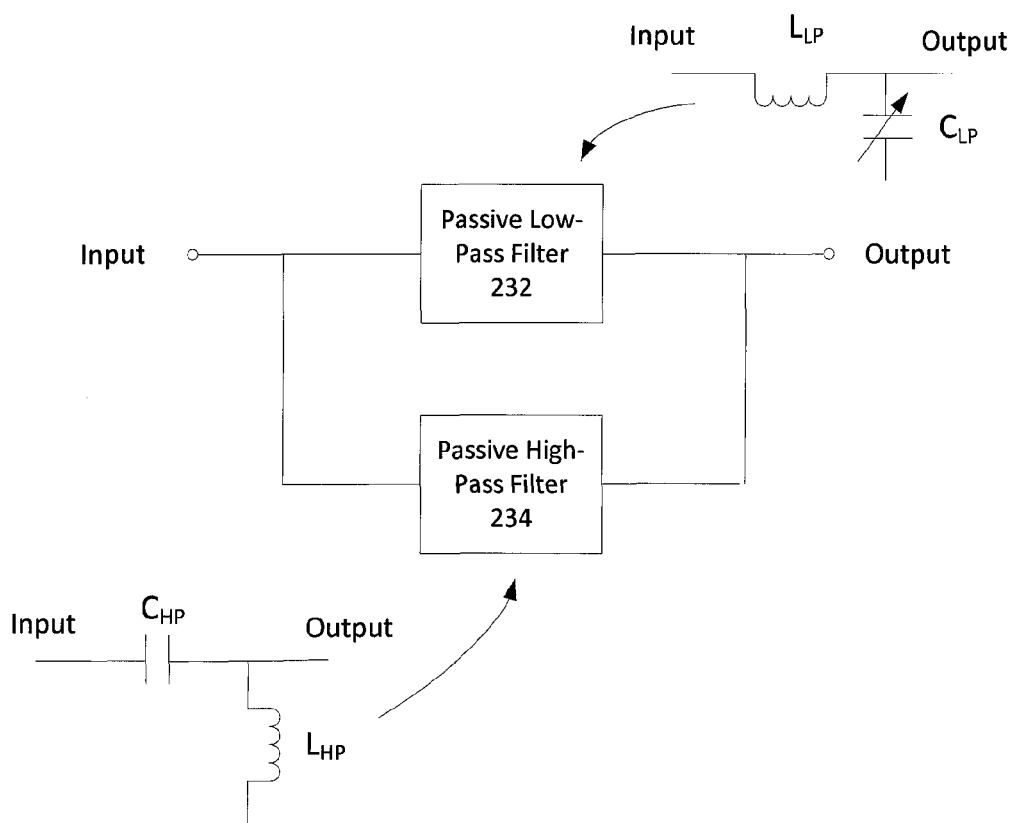
FIG. 2D   110P or 110N

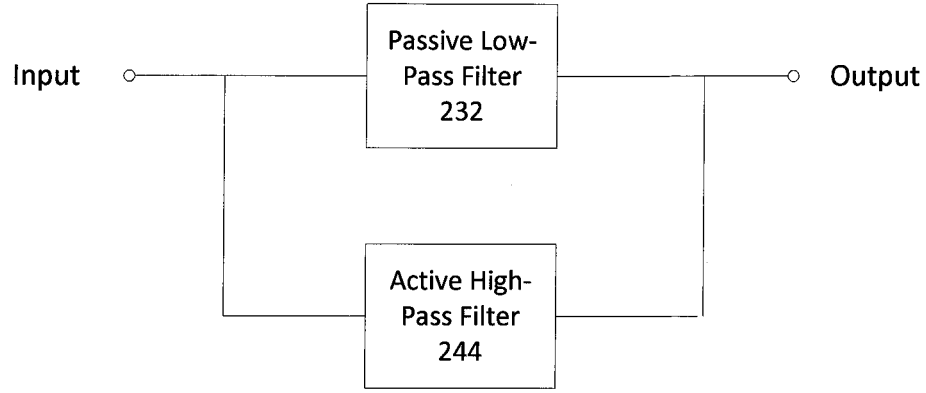
FIG. 2F  110P or 110N
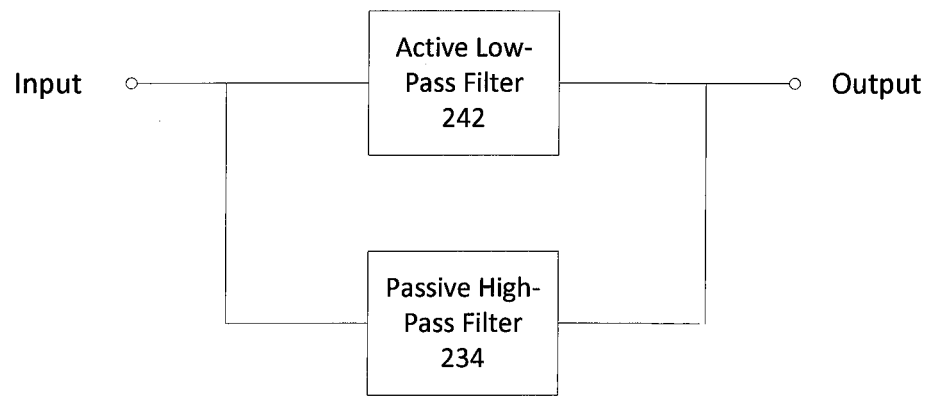
FIG. 2G  110P or 110N

APPARATUS AND METHODS FOR ADAPTIVE RECEIVER DELAY EQUALIZATION

BACKGROUND

1. Technical Field

The present invention relates generally to communication links including, but not limited to, serial interfaces for integrated circuits.

2. Description of the Background Art

Transceivers are used to form high speed serial interface (HSSI) links between integrated circuits (ICs). The transceivers typically use differential voltage signals to transmit and receive data. One aspect of the differential voltage signaling that limits performance is differential skew.

Differential skew introduces inter-symbol interference and results in attenuation of the differential signal. Differential skew occurs when the positive and negative paths to deliver their signals at different moments at the end of a differential channel. Differential skew may be caused by non-ideal effects in actual circuits, such as unequal conductor lengths and unmatched twists.

SUMMARY

Disclosed are apparatus and methods for adaptive receiver delay equalization.

One embodiment relates to a method for adaptive receiver delay equalization. Filtered positive and negative polarity signals are generated by a first variable-delay filter and a second variable-delay filter, respectively. A delay difference is determined between the filtered positive and negative polarity signals, and a skew-indication signal is generated based on the delay difference. A delay control signal is generated based on the skew-indication signal, and the delay control signal is sent to at least one of the first and second variable-delay filters.

Another embodiment relates to an integrated circuit including first and second variable-delay filters, a skew detector, an equalization control circuit, and a receiver buffer. The first and second variable-delay filters are linear phase filters that receive a differential signal and output a de-skewed differential signal. The equalization control circuit for controls delays of the variable-delay filters based on the skew-indication signal. The receiver buffer buffers the de-skewed differential signal.

Another embodiment relates to an adaptive receiver delay equalization circuit. The circuit includes at least first and second variable-delay filters, a bias control circuit, a skew detector, and an equalization control circuit. The bias control circuit has bias voltage outputs which are connected to bias inputs of the first and second variable-delay filters and is electronically programmed with bias voltage settings corresponding to a predetermined data rate. The data input of the first variable-delay filter receives a positive polarity signal of a differential signal, and the data input of the second variable-delay filter receives a negative polarity signal of the differential signal. The outputs of the first and second variable-delay filters provide a de-skewed differential signal and are connected to the first and second inputs of the skew detector. The output of the skew detector provides a skew-indication signal and is connected to the input of the equalization control circuit. The outputs of the equalization control circuit are used to adjust the delays of the filters and are connected to the control inputs of the first and second variable-delay filters.

Other embodiments, aspects, and features are also disclosed.

BRIEF DESCRIPTION OF THE DRAWINGS

FIG. 2A through 2H depict alternative implementations of the delay filters in the circuit apparatus of FIG. 1 in accordance with embodiments of the invention.

DETAILED DESCRIPTION

The present disclosure provides methods and circuit apparatus which adaptively equalize the delays in the positive and negative paths of a differential receiver. The methods and apparatus described herein advantageously provide an on-die solution which removes receiver differential skew in an automatic manner to compensate for non-ideal effects in actual circuits, such as unequal conductor lengths and unmatched twists.

Figure 1:
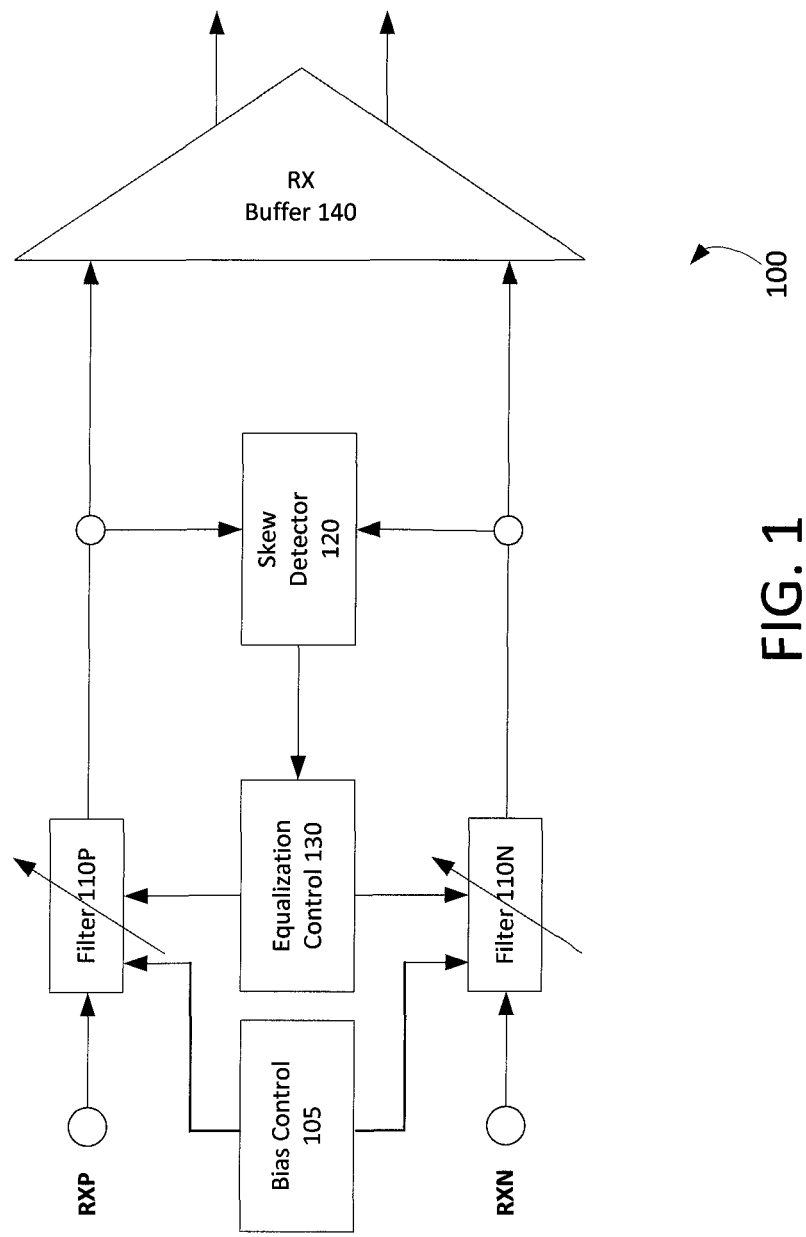
FIG. 1 is schematic diagram of an exemplary circuit apparatus for adaptive receiver delay equalization in accordance with an embodiment of the invention.

FIG. 1 is schematic diagram of an exemplary apparatus 100 for adaptive receiver delay equalization in accordance with an embodiment of the invention. The apparatus receives a differential signal and adaptively equalizes delay on positive and negative paths to de-skew the differential signal. As shown, the apparatus 100 includes a bias control circuit 105, a first variable-delay filter 110P, a second variable-delay filter 110N, a skew detector 120, an equalization control circuit 130, and a receiver (RX) buffer 140.

Both the first and second variable-delay filters (110P and 110N) have a data input, a data output, a control input and a bias input. The first variable-delay filter 110P receives the positive polarity signal of the differential signal on its data input, and the second variable-delay filter 110N receives the negative polarity signal of the differential signal on its data input.

In accordance with an embodiment of the invention, each of the first and second variable-delay filters (110P and 110N) may be a linear phase filter 202 as depicted in FIG. 2A. The linear phase filter 202 provides a phase shift that varies linearly with frequency. The linear phase filter 202 may be implemented, for example, using a Bessel filter 212 as depicted in FIG. 2B. In addition to a linear phase characteristic, each of the first and second variable-delay filters may be characterized, below a cut-off frequency, by a flat gain (as a function of frequency) and a constant group delay (as a function of frequency).

In accordance with an embodiment of the invention, each of the first and second variable-delay filters (110P and 110N) may be a dual-path filter. As depicted in FIG. 2C, the dual-path filter may include an integral path 222 and a feed-forward path 224. The integral path 222 may be formed using a low-pass filter, and the feed-forward path 224 may be formed using a high-pass filter.

In one embodiment, which is depicted in FIG. 2D, a passive low-pass filter 232 may be used for the integral path 222, and a passive high-pass filter 234 may be used for the feed-forward path 224. It is contemplated that the passive low-pass and high-pass filters (232 and 234, respectively) may be implemented using various filter circuits.

In a simple example, shown in FIG. 2D, the passive low-pass filter 232 may be formed using an LC circuit having an inductor $L_{LP}$ and a variable capacitor $C_{LP}$, and the passive high-pass filter 234 may be formed using an LC circuit having a capacitor $C_{HP}$ and an inductor $L_{HP}$. Per the example passive low-pass filter circuit shown, the inductor $L_{LP}$ may be connected between the filter input node and the filter output node in the integral path 222, and the variable capacitor $C_{LP}$ may be connected between the filter output node and ground. Per the example high-pass filter circuit shown, the capacitor $C_{HP}$ may be connected between the filter input node and the filter output node in the feed-forward path 224, and the inductor $L_{HP}$ may be connected between the filter output node and ground. The capacitance of the variable capacitor $C_{LP}$ may be varied under control of the equalization control circuit 130 in order to change the group delay of the filter (110P and/or 110N).

Figure 2E:
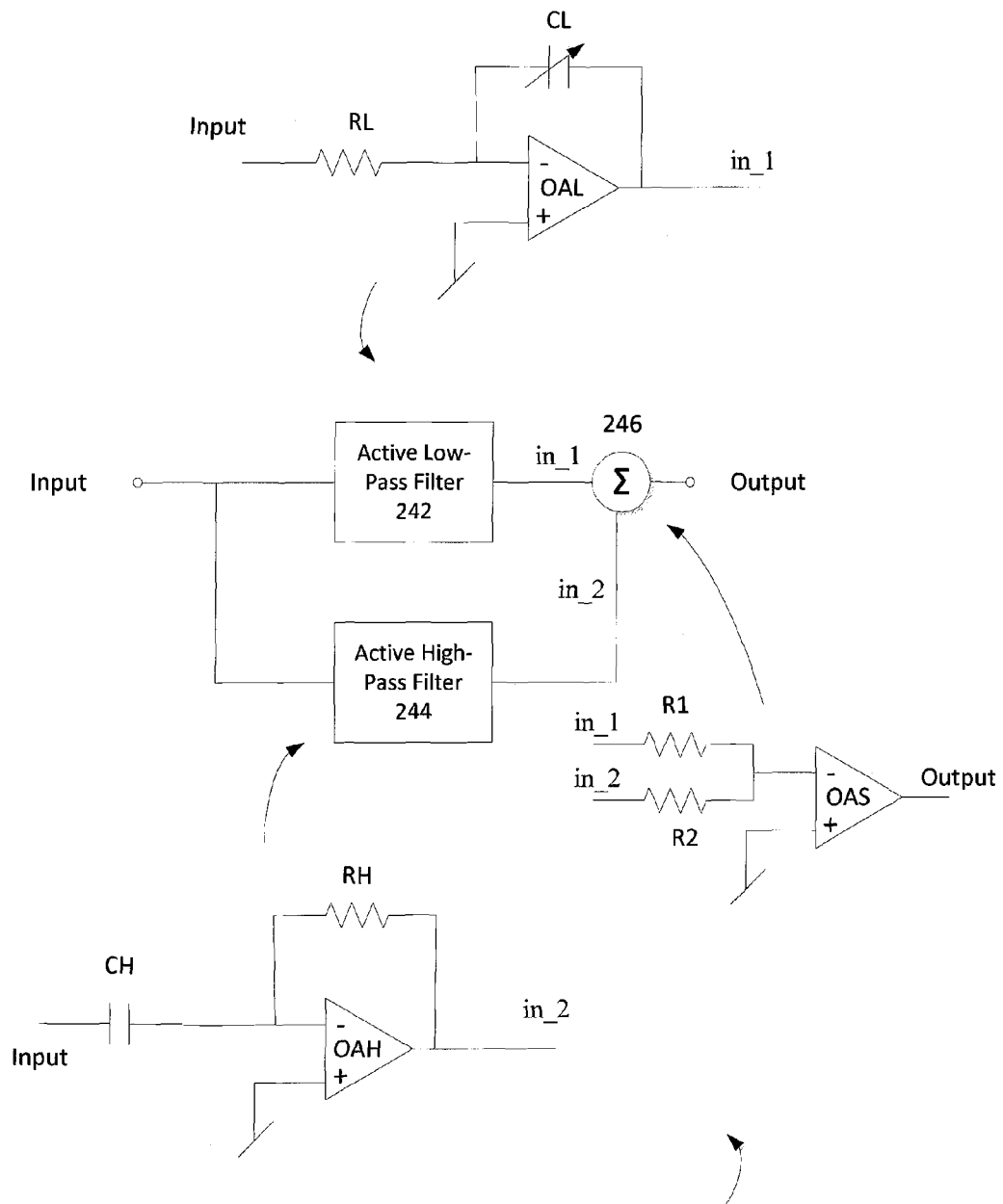

In another embodiment, which is depicted in FIG. 2E, an active low-pass filter 242 may be used for the integral path 222, an active high-pass filter 244 may be used for the feed-forward path 224, and a voltage summer 246 may be used to add together the voltage outputs of the active low-pass and high-pass filters. It is contemplated that the active low-pass and high-pass filters (242 and 244, respectively) may be implemented using various filter circuits.

In a simple example, shown in FIG. 2E, the active low-pass filter 242 may be formed using an operational amplifier OAL, a resistor RL, and a variable capacitor CL, the active high-pass filter 244 may be formed using an operational amplifier OAL, a resistor RH, and a capacitor CH, and the voltage summer 246 may be formed using an operational amplifier OAS, a first resistor R1 and a second resistor R2.

Per the example low-pass filter circuit shown, the operational amplifier OAL may have its non-inverting input connected to ground, its inverting input connected to the node between the resistor RL and the variable capacitor CL, and its output connected to the first input (in_1) of the voltage summer 246. The resistor RL may be connected between the input node and the inverting input of the operational amplifier OAL, and the variable capacitor CL may be connected between the output node and the inverting input of the operational amplifier OAL.

Per the example high-pass filter circuit shown, the operational amplifier OAH may have its non-inverting input connected to ground, its inverting input connected to the node between the resistor RH and the capacitor CH, and its output connected to the second input (in_2) of the voltage summer 246. The resistor RH may be connected between the output node and the inverting input of the operational amplifier OAL, and the capacitor CH may be connected between the input node and the inverting input of the operational amplifier OAL. The capacitance of the variable capacitor CL may be varied under control of the equalization control circuit 130 in order to change the group delay of the filter (110P and/or 110N).

Per the example voltage summer circuit shown, the first resistor R1 may be connected between the first input (in_1) and the inverting input of the operational amplifier OAS, and the second resistor R2 may be connected between the second input (in_2) and the inverting input of the operational amplifier OAS. The non-inverting input of the operational amplifier OAS may be connected to ground, and the output of the operational amplifier OAS may be connected to the output node.

In another embodiment, which is depicted in FIG. 2F, a passive low-pass filter 232 may be used for the integral path 222, and an active high-pass filter 244 may be used for the feed-forward path 224. It is contemplated that the passive low-pass and active high-pass filters (232 and 244, respectively) may be implemented using various filter circuits.

In another embodiment, which is depicted in FIG. 2G, an active low-pass filter 242 may be used for the integral path 222, and a passive high-pass filter 234 may be used for the feed-forward path 224. It is contemplated that the passive low-pass and active high-pass filters (242 and 234, respectively) may be implemented using various filter circuits.

Figure 2H:
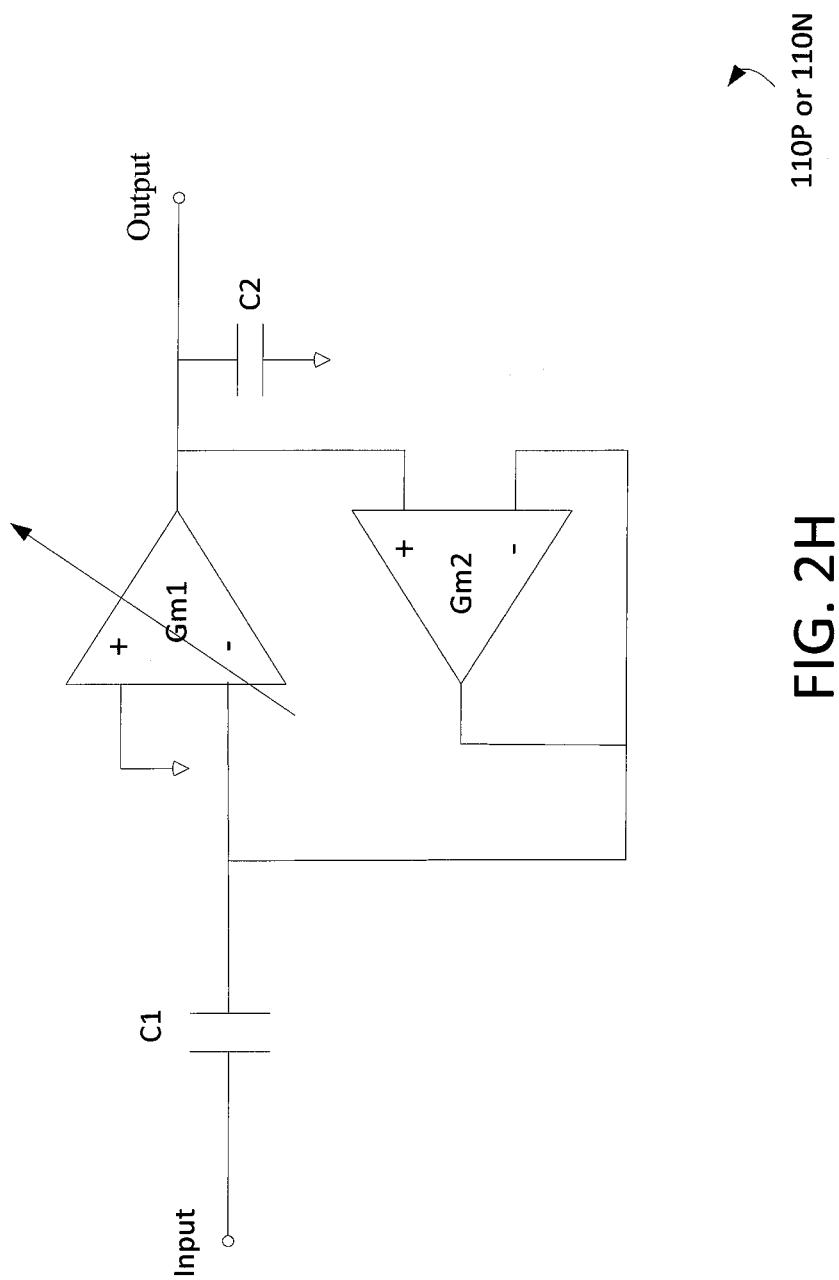

In another embodiment, each of the first and second variable-delay filters (110P and 110N) may be implemented with a circuit based on transconductance amplifiers, such as the example circuit depicted in FIG. 2H. As shown in FIG. 2H, a first capacitor C1 may be connected between the input node and the inverting input of a first transconductance amplifier Gm1. The non-inverting input of the first transconductance amplifier Gm1 may be connected to ground, while the output of the first transconductance amplifier Gm1 may be connected to the output node. The second capacitor C2 may be connected between the output node and ground. Finally, the second transconductance amplifier Gm2 may have its non-inverting input connected to the output of the first transconductance amplifier Gm1 (i.e. to the output node), its inverting input connected to its output, and its output connected to the inverting input of the first transconductance amplifier Gm1.

In accordance with an embodiment of the invention, the transconductance (i.e. Gm) of the first transconductance amplifier Gm1 may be varied. In particular, the transconductance of the first transconductance amplifier Gm1 may be varied by varying the bias current of the amplifier. The variation of the transconductance may be performed to adjust the delay of the filter (110P and/or 110N). To configure the circuit of FIG. 2H for different data rates, different capacitor values for C1 and C2 may be selected.

Note that the above-discussed filter implementations are generally first-order (passive or active) filter circuits. In other implementations, second-order or higher-order filter circuits may be used.

Referring back to FIG. 1, the bias control circuit 105 has outputs which are connected to bias inputs of the first and second variable-delay filters (110P and 110N, respectively). The bias control circuit 105 generates bias voltages. The bias voltages may be based on a data rate setting for the receiver. The data rate setting may be electronically programmed into the integrated circuit. For example, the integrated circuit may be a field programmable gate array (FPGA), and the data rate setting may be configured during programming of the FPGA. The bias voltages are provided by the bias control circuit 105 to the bias inputs of the first and second variable-delay filters.

For example, if the data rate setting is at 6 gigabits per second (Gbps) or a principle frequency of 3 gigahertz (GHz), then the bias voltages may be set to a first level (L1) such that the cut-off frequency of the first and second variable-delay filters (110P and 110N) is at 9 GHz. In another example, if the data rate setting is at 9 Gbps or a principle frequency of 4.5 GHz, then the bias voltages may be set to a second level (L2) such that the cut-off frequency is at 13.5 GHz. The second level L2 provides a higher bias current for the first and second variable-delay filters than the first level L1. In another example, if the data rate setting is at 10 Gbps or a principle frequency of 5 GHz, then the bias voltages may be set to a third level (L3) such that the cut-off frequency is at 15 GHz. The third level L3 provides a higher bias current for the first and second variable-delay filters than the second level L2. In another example, if the data rate setting is at 12 Gbps or a principle frequency of 6 GHz, then the bias voltages may be set to a fourth level (L4) such that the cut-off frequency is at 18 GHz. The fourth level L4 provides a higher bias current for the first and second variable-delay filters than the third level L3. More generally, if the data rate setting is at X Gbps or a principle frequency of $0.5 \times$ GHz, then the bias voltages may be set to a level such that the cut-off frequency of the first and second variable-delay filters is at $1.5 \times$ GHz.

The skew detector 120 has a first input, a second input, and an output. The first input of the skew detector 120 is connected to the output of the first variable-delay filter, and the second input of the skew detector is connected to the output of the second variable-delay filter. The skew detector 120 determines a delay difference between the positive and negative polarity signals of the differential signal and outputs a skew-indication signal based on the delay difference.

The equalization control circuit 130 has an input and first and second outputs. The input of the equalization control circuit 130 is connected to the output of the skew detector 120. The first output of the equalization control circuit 130 is connected to the control input of the first variable-delay filter 110P, and the second output of the equalization control circuit 130 is connected to the control input of the second variable-delay filter 110N.

The equalization control circuit may be advantageously embodied as programmed logic circuitry, for example, within a field programmable gate array. This allows the equalization control circuit to be flexibly configured to suit particular characteristics of a communication channel that is being used.

In one embodiment, the equalization control circuit 130 may output discrete control signals to the first and second variable-delay filters (110P and 110N, respectively). In this case, the first and second variable-delay filters may have delays that are step adjustable.

In another embodiment, the equalization control circuit 130 may output analog control signals to the first and second variable-delay filters. In this case, the first and second variable-delay filters may have delays that are continuously adjustable.

In one implementation, the skew-indication signal from the skew detector 120 to the equalization control circuit 130 may include one of two pulses: an up pulse; and a down pulse. If the up pulse is received, then the equalization control circuit 130 may decrease the delay of the first variable-delay filter 110P relative to the second variable-delay filter 110N by one discrete step. On the other hand, if the down pulse is received, then the equalization control circuit 130 may increase the delay of the second variable-delay filter 110N relative to the first variable-delay filter 110P by one discrete step.

The resultant output of the first and second variable-delay filters (110P and 110N, respectively) are the positive and negative polarity signals of the differential signal after it has been de-skewed. The receiver buffer 140 receives the de-skewed differential signal on its two inputs, and drives the de-skewed differential signal onto its two outputs.

Figure 3A:
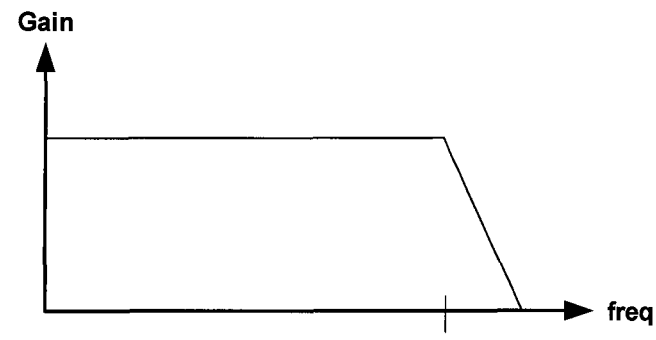
FIG. 3A depicts a graph of gain versus frequency for a linear phase filter in accordance with an embodiment of the invention.
Figure 3B:
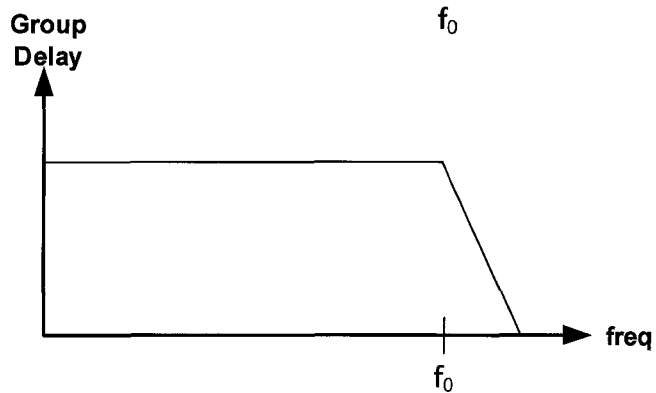
FIG. 3B depicts a graph of group delay versus frequency for a linear phase filter in accordance with an embodiment of the invention.
Figure 3C:
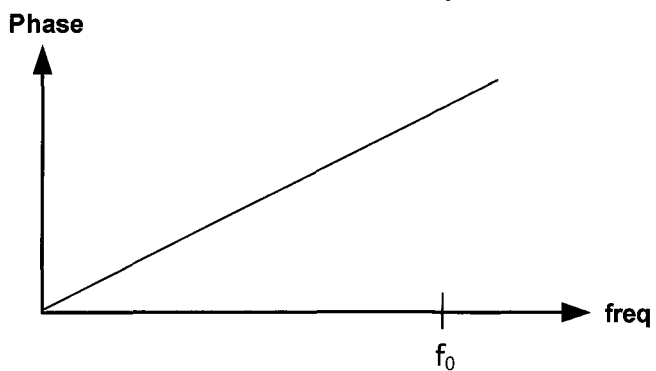
FIG. 3C depicts a graph of phase versus frequency for a linear phase filter in accordance with an embodiment of the invention.

FIGS. 3A, 3B and 3C show gain, group delay, and phase as a function of frequency for a linear phase filter in accordance with an embodiment of the invention. As shown in FIG. 3A, the gain is flat up to a cut-off frequency, $f_o$, for the linear phase filter. In accordance with an embodiment of the invention, the cut-off frequency of the linear phase filter may be configured by programmably setting the bias voltage levels of the first and second variable-delay filters (110P and 110N, respectively) using the bias control circuit 105. The flat gain in the frequency range below the cut-off frequency avoids signal distortion. As the frequency range in the transfer function includes the frequencies below the cut-off frequency, the filter may be considered to be an all-pass filter in this frequency range.

As shown in FIG. 3B, the group delay is constant (flat) up to the cut-off frequency for the linear phase filter. The constant group delay in the frequency range below the cut-off frequency enables the linear phase shift characteristic. This linear phase shift characteristic is shown in FIG. 3C, where the phase is seen to vary linearly with frequency.

Figure 4:
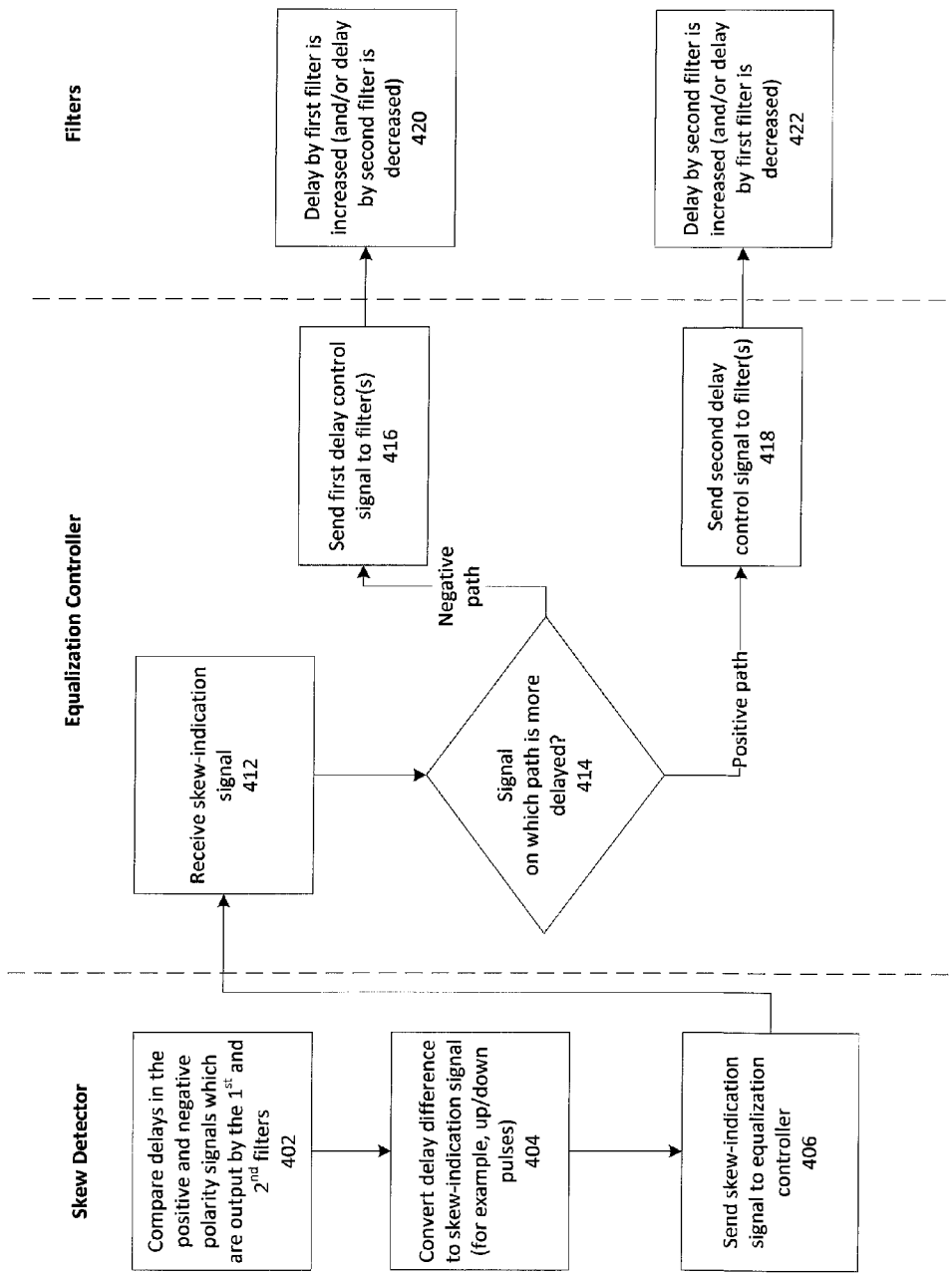
FIG. 4 is a flow diagram showing a method of delay equalization using select components in the apparatus of FIG. 1 in accordance with an embodiment of the invention.

FIG. 4 is a flow diagram showing a method 400 of delay equalization using select components in the apparatus 100 of FIG. 1 in accordance with an embodiment of the invention. The steps shown in FIG. 4 are performed by the skew detector 120, the equalization controller 130 and the filters (110P and 110N).

Per block 402, the skew detector 120 compares delays in the positive and negative polarity signals which are output by the first and second variable-delay filters (110P and 110N, respectively). In block 404, the skew detector 120 converts the delay difference to a skew-indication signal. For example, the skew-indication signal may be up/down pulses in one implementation. Per block 406, the skew-indication signal is sent from the skew detector 120 to the equalization controller 130.

In block 412, the equalization controller 130 receives the skew-indication signal. Per block 414, a determination is then made by the equalization controller 130 as to whether the signal on the positive path or the signal on the negative path is more delayed. This determination is made based on the skew-indication signal. If the signal on the negative path is more delayed, then a first control signal may be sent to the filter (or filters) per block 416. On the other hand, if the signal on the positive path is more delayed, then a second control signal may be sent to the filter (or filters) per block 418.

If the first delay control signal is sent to the filter(s) per block 416, then the delay of the first variable-delay filter 110P is increased (and/or the delay of the second variable-delay filter 110N is decreased) per block 420. By doing so, the delay on the positive path is increased relative to the delay on the negative path. This reduces the delay difference that was detected.

On the other hand, if the second delay control signal is sent to the filter(s) per block 418, then the delay of the second variable-delay filter 110P is increased (and/or the delay of the first variable-delay filter 110N is decreased) per block 422. By doing so, the delay on the negative path is increased relative to the delay on the positive path. This reduces the delay difference that was detected.

Figure 5:
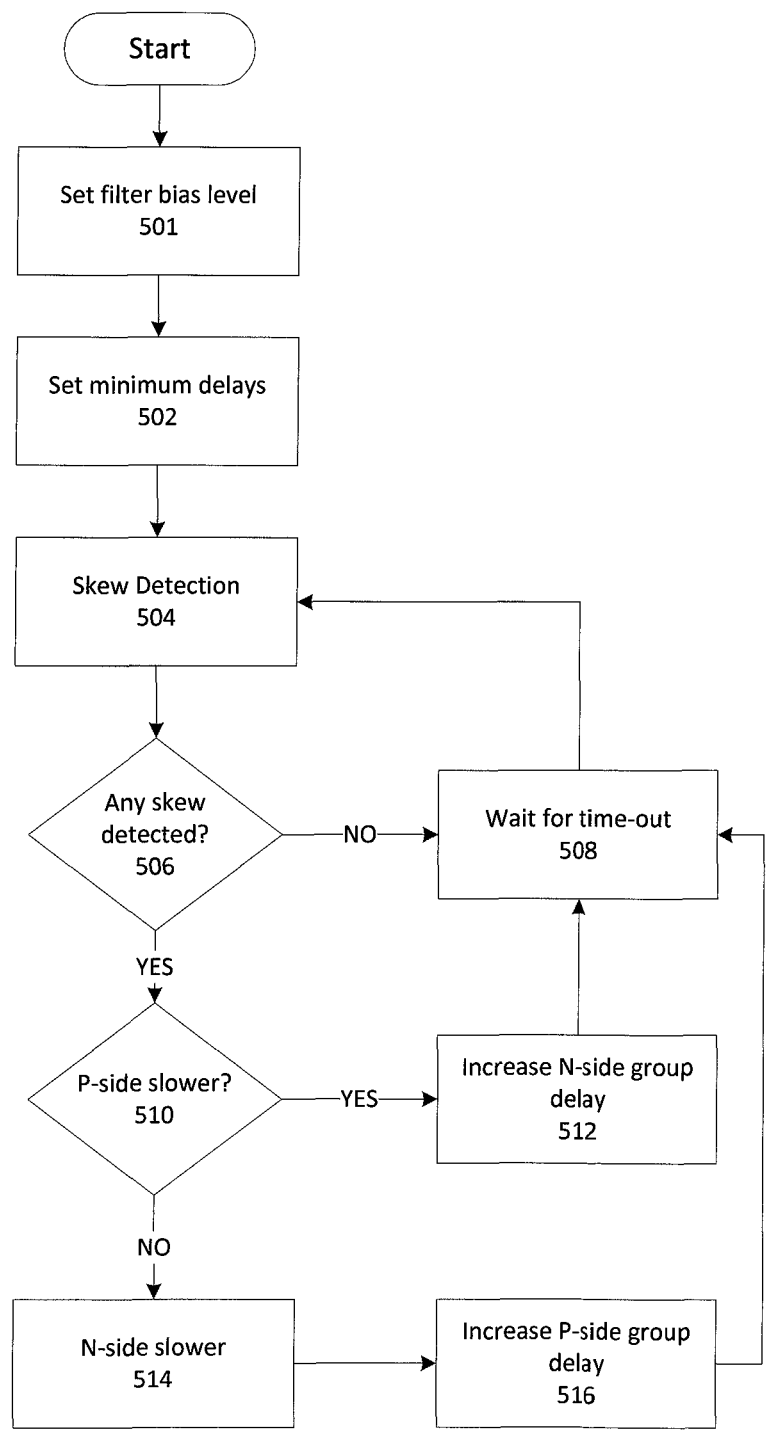
FIG. 5 is a flow chart of a method for adaptive delay equalization for a receiver in an integrated circuit in accordance with an embodiment of the invention.

FIG. 5 is a flow chart of a method 500 for adaptive delay equalization for a receiver in an integrated circuit in accordance with an embodiment of the invention. In this method, positive and negative polarity signals of a differential signal are received at data inputs of the first and second variable-delay filters, respectively, and the first and second variable-delay filters output filtered versions of the positive and negative polarity signals, respectively.

In block 502, minimum delays may be set for variable-delay filters in the positive and negative paths of the differential signal. In this implementation, the delays of the variable-delay filters are increased in an adaptive manner to equalize the delays of the positive and negative paths.

In block 506, skew detection may be performed by the skew detector. The skew detection may include determination of a delay difference between the filtered positive and negative polarity signals. A skew-indication signal may be generated based on the delay difference.

If no skew or a negligible amount of skew is detected, then the method 500 may wait for a time-out indication per block 508 before looping back to again perform skew detection per block 504. The negligible amount of skew may be determined by the magnitude of the delay difference being below a minimum threshold, for example.

If skew (above a negligible amount) is detected, then a determination may be made, per block 510, as to whether the positive path (p-side) is slower. If the positive path is slower, then the delay of the negative path (n-side) may be increased per block 512.

Otherwise, the negative path may be deemed slower per block 514, and the delay of the positive path (p-side) may be increased per block 516. If the skew detection is analog (continuous) or discrete with multiple levels, then the delay increase of the n-side or p-side may be varied in relation to the delay difference detected.

Figure 6:
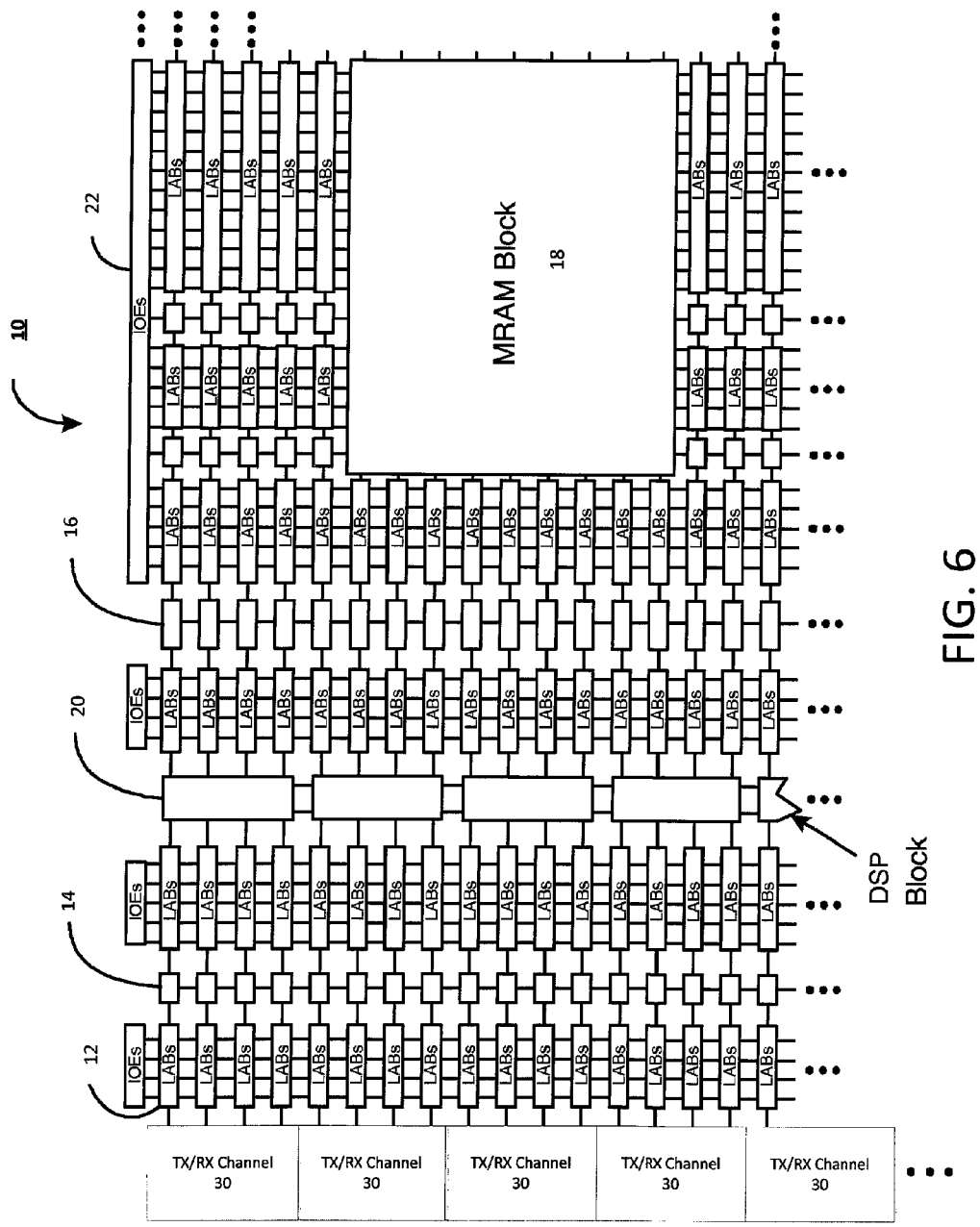
FIG. 6 is a simplified partial block diagram of an exemplary field programmable gate array that may be configured to implement an embodiment of the present invention.
Figure 7:
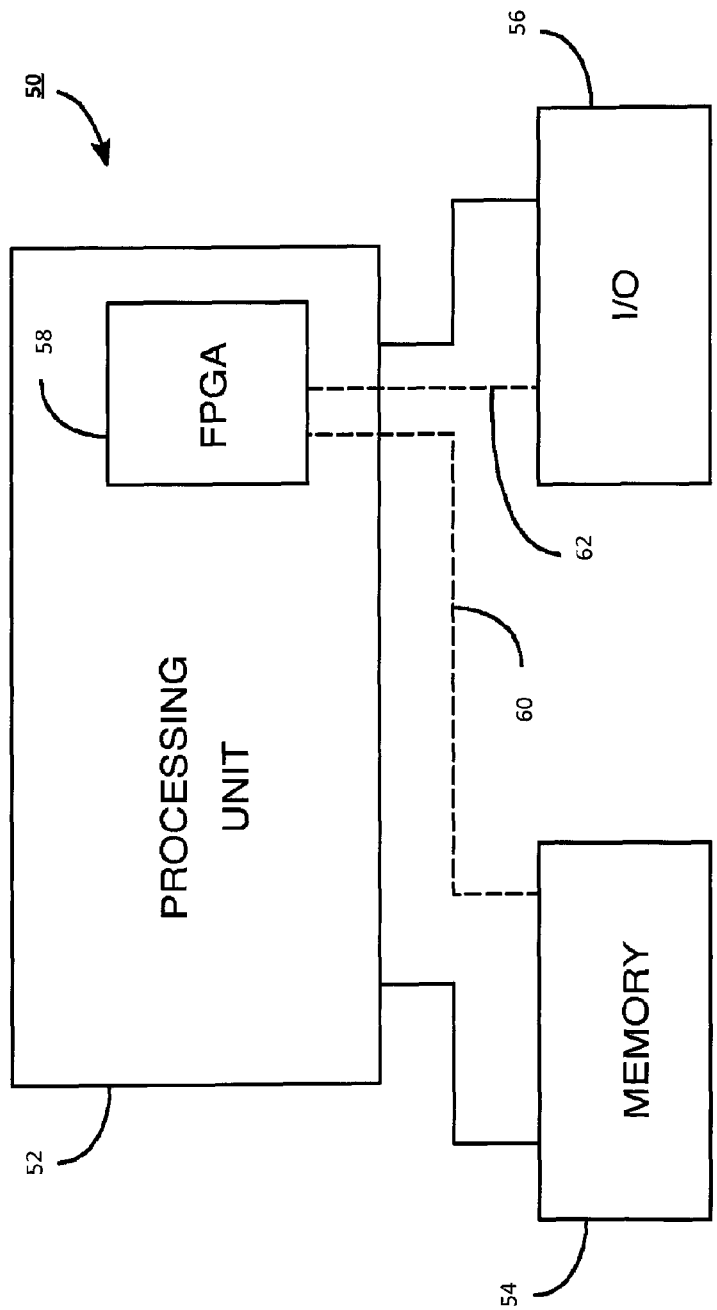
FIG. 7 shows a block diagram of an exemplary digital system that may employ the methods and apparatus disclosed herein.

FIG. 6 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10.

A transceiver (TX/RX) channel array may be arranged as shown, for example, with each TX/RX channel circuit 30 being coupled to several LABs. A TX/RX channel circuit 30 may include, among other circuitry, receiver circuitry as described herein.

It is to be understood that FPGA 10 is described herein for illustrative purposes only and that the present invention can be implemented in many different types of PLDs, FPGAs, and ASICs.

FIG. 8 shows a block diagram of an exemplary digital system 50 that may employ apparatus and methods disclosed herein. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for adaptive receiver delay equalization, the method comprising:

receiving positive and negative polarity signals of a differential signal at data inputs of a first variable-delay filter and a second variable-delay filter, respectively, wherein each of the first and second variable-delay filters comprises a linear phase filter which provides a phase shift that varies linearly with frequency;

generating filtered positive and negative polarity signals by the first variable-delay filter and the second variable-delay filter, respectively;

determining a delay difference between the filtered positive and negative polarity signals by a skew detector;

generating a skew-indication signal by the skew detector based on the delay difference;

generating a delay control signal by an equalization control circuit based on the skew-indication signal; and sending the delay control signal to at least one of the first and second variable-delay filters.

2. The method of claim 1, wherein at least one of the first and second variable-delay filters comprises a Bessel filter.

3. The method of claim 1, wherein at least one of the first and second variable-delay filters has a flat gain and a constant group delay below a cut-off frequency.

4. The method of claim 1, wherein at least one of the first and second variable-delay filters comprises a dual-path filter.

5. The method of claim 4, wherein the dual-path filter comprises an integral path and a feed-forward path.

6. The method of claim 1, wherein at least one of the first and second variable-delay filters comprises a passive LC network, wherein the passive LC network includes at least one inductor and at least one capacitor.

7. The method of claim 1,
generating voltage bias levels based on a data rate setting; and
providing voltage bias levels to bias inputs of the first and second variable-delay filters.

8. The method of claim 1, wherein at least one of the first and second variable-delay filters comprises a transconductance amplifier, further comprising:
varying a bias current for the transconductance amplifier using the delay control signal.

9. The method of claim 1, wherein the skew-indication signal comprises one of two pulses, wherein a first pulse of the two pulses causes the equalization control circuit to increase a delay of the first variable-delay filter relative to the second variable-delay filter, and a second pulse of the two pulses causes the equalization control circuit to increase a delay of the second variable-delay filter relative to the first variable-delay filter.

10. The method of claim 1, wherein the delay control signal comprises a discrete control signal, and wherein the first and second variable-delay filters have delays that are step adjustable.

11. The method of claim 1, wherein the delay control signal comprises an analog control signal, and wherein the first and second variable-delay filters have delays that are continuously adjustable.

12. An integrated circuit comprising:
first and second variable-delay filters for receiving a differential signal and outputting a de-skewed differential signal, wherein each of the first and second variable-delay filters comprises a linear phase filter which provides a phase shift that varies linearly with frequency;
a skew detector for detecting a delay difference between outputs of the first and second filters and generating a skew-indication signal based on the delay difference;
an equalization control circuit for controlling delays of the variable-delay filters based on the skew-indication signal; and
a receiver buffer for buffering the de-skewed differential signal.

13. The integrated circuit of claim 12 further comprising:
a bias control circuit having outputs which are connected to bias inputs of the first and second variable-delay filters, wherein the bias control circuit provides voltage bias levels to the bias inputs of the first and second variable-delay filters.

14. The integrated circuit of claim 13, wherein the voltage bias levels are based on a data rate setting, and wherein the data rate setting is electronically programmed into the integrated circuit.

15. The integrated circuit of claim 12, wherein the first and second variable-delay filters each comprises a transconductance amplifier, and wherein the delay control signal varies a bias current for the transconductance amplifier.

16. The integrated circuit of claim 12, wherein the skew detector determines a delay difference between the positive and negative polarity signals of the differential signal and outputs a skew-indication signal based on the delay difference.

17. The integrated circuit of claim 16, wherein the skew-indication signal comprises one of two pulses, wherein a first pulse of the two pulses causes the equalization control circuit to increase a delay of the first variable-delay filter relative to the second variable-delay filter, and a second pulse of the two pulses causes the equalization control circuit to increase a delay of the second variable-delay filter relative to the first variable-delay filter.

18. The integrated circuit of claim 12, wherein the equalization control circuit outputs discrete control signals to the first and second variable-delay filters, and wherein the first and second variable-delay filters have delays that are step adjustable.

19. The integrated circuit of claim 12, wherein the equalization control circuit outputs analog control signals to the first and second variable-delay filters, and wherein the first and second variable-delay filters have delays that are continuously adjustable.

20. The integrated circuit of claim 12, wherein the equalization control circuit comprises programmed logic within a field programmable gate array.

21. An adaptive receiver delay equalization circuit comprising:
a first variable-delay filter having a data input, a control input and an output, wherein the data input of the first variable-delay filter receives a positive polarity signal of a differential signal;
a second variable-delay filter having a data input, a control input and an output, wherein the data input of the second variable-delay filter receives a negative polarity signal of the differential signal,
a bias control circuit having bias voltage outputs which are connected to bias inputs of the first and second variable-delay filters, wherein the bias control circuit is electronically programmed with bias voltage settings corresponding to a predetermined data rate;
a skew detector having a first input, a second input, and an output, wherein the first input of the skew detector is connected to the output of the first variable-delay filter, and the second input of the skew detector is connected to the output of the second variable-delay filter; and
an equalization control circuit having an input and first and second outputs, wherein the input of the equalization control circuit is connected to the output of the skew detector, the first output of the equalization control circuit is connected to the control input of the first variable-delay filter, and the second output of the equalization control circuit is connected to the control input of the second variable-delay filter.

* * * * *